(12) United States Patent
Lee et al.

(10) Patent No.: US 11,241,299 B2
(45) Date of Patent: Feb. 8, 2022

(54) INDUCTION HEATING TYPE DENTAL FILLING DEVICE

(71) Applicant: B&L BIOTECH, INC., Ansan-si (KR)

(72) Inventors: In Whan Lee, Seoul (KR); Seung Ki Baek, Seoul (KR); Gil Hwan Sung, Seoul (KR); In Jeong Choi, Seoul (KR); Myun Hwan Ahn, Namyangju-si (KR)

(73) Assignee: B&L BIOTECH, INC., Ansan-si (KR)

( * ) Notice: Subject to any disclaimer, the term of this patent is extended or adjusted under 35 U.S.C. 154(b) by 506 days.

(21) Appl. No.: 16/322,750

(22) PCT Filed: Sep. 23, 2016

(86) PCT No.: PCT/KR2016/010620
§ 371 (c)(1),
(2) Date: Feb. 1, 2019

(87) PCT Pub. No.: WO2018/026052
PCT Pub. Date: Feb. 8, 2018

(65) Prior Publication Data
US 2021/0330427 A1 Oct. 28, 2021

(30) Foreign Application Priority Data
Aug. 4, 2016 (KR) .................. 10-2016-0099600

(51) Int. Cl.
*A61C 5/62* (2017.01)
(52) U.S. Cl.
CPC .................... *A61C 5/62* (2017.02)
(58) Field of Classification Search
CPC ... A61C 5/62; B05C 17/0053; B05C 17/0052; B05C 17/00533; B05C 17/00526; B05C 17/00546
See application file for complete search history.

(56) References Cited

U.S. PATENT DOCUMENTS

| | | | |
|---|---|---|---|
| 3,954,206 A * | 5/1976 | Salonen | B05C 17/00533 222/146.5 |
| 4,265,618 A | 5/1981 | Herskovitz et al. | |
| 4,357,136 A | 11/1982 | Herskovitz et al. | |
| 5,584,419 A * | 12/1996 | Lasko | B05C 17/00533 219/240 |

(Continued)

FOREIGN PATENT DOCUMENTS

| | | |
|---|---|---|
| KR | 10-0614628 B1 | 8/2006 |
| KR | 10-0668424 B1 | 1/2007 |

(Continued)

OTHER PUBLICATIONS

Korean Notice of Allowance for 10-2016-0099600 dated Feb. 13, 2018.

(Continued)

*Primary Examiner* — Nicholas D Lucchesi
(74) *Attorney, Agent, or Firm* — Sughrue Mion, PLLC

(57) ABSTRACT

The present invention discloses an induction heating type dental filling device including a body unit grippable by a user, a filling unit containing a refillable filling material and connected to the body unit so that one side thereof is insulated from the body unit, a heating unit disposed in close contact with the filling unit and heating the filling material using induced current to convert the filling material into a liquid state, a pressing unit for pressing the heated filling material to discharge the heated filling material to the outside of the filling unit, and a shielding unit for shielding the heat and magnetic field of the heating unit. According to this configuration, heat loss through the filling unit may be prevented and clamping force for the body unit may be excellent, so that the efficiency of filling a filling material for dental treatment may be improved.

17 Claims, 3 Drawing Sheets

(56) References Cited

U.S. PATENT DOCUMENTS

| | | | | |
|---|---|---|---|---|
| 6,202,892 B1* | 3/2001 | Lasko | B05C 17/0053 | 222/108 |
| 6,230,936 B1* | 5/2001 | Lasko | B05C 17/0053 | 219/426 |
| 6,257,887 B1* | 7/2001 | Heckerman | A61C 3/00 | 433/141 |
| 6,616,448 B2 | 9/2003 | Friedman | | |
| 7,086,861 B2* | 8/2006 | Pitz | A61C 5/62 | 401/1 |
| 7,520,408 B1* | 4/2009 | Smith | B05C 17/0053 | 219/200 |
| 9,427,768 B2* | 8/2016 | Varga | B05C 11/1034 | |
| 10,645,762 B2* | 5/2020 | Elserman | H05B 6/36 | |
| 2003/0165793 A1* | 9/2003 | Yobel | A61C 5/62 | 433/90 |
| 2005/0170313 A1* | 8/2005 | Pitz | A61C 5/62 | 433/90 |
| 2015/0230900 A1* | 8/2015 | Gente | A61C 1/088 | 433/27 |
| 2018/0085196 A1* | 3/2018 | Li | A61C 5/55 | |
| 2021/0137639 A1* | 5/2021 | Fontein | A61C 5/66 | |

FOREIGN PATENT DOCUMENTS

| | | |
|---|---|---|
| KR | 10-2008-0080470 A | 9/2008 |
| KR | 10-1209811 B1 | 12/2012 |

OTHER PUBLICATIONS

Korean Office Action for 10-2016-0099600 dated Aug. 21, 2017.
International Search Report For PCT/KR2016/010620 dated May 22, 2017 (PCT/ISA/210).

\* cited by examiner

INDUCTION HEATING TYPE DENTAL FILLING DEVICE

CROSS-REFERENCE TO RELATED APPLICATION

This application is a National Stage of International Application No. PCT/KR2016/010620 filed Sep. 23, 2016, claiming priority based on Korean Patent Application No. 10-2016-0099600, filed on Aug. 4, 2016, the disclosure of which is incorporated herein by reference.

TECHNICAL FIELD

The present invention relates to an induction heating type dental filling device. More particularly, the present invention relates to an induction heating type dental filling device having excellent heating properties by preventing heat loss in a reservoir containing a filling material and having improved operational stability due to increased clamping force.

BACKGROUND ART

Tooth decay, i.e., dental caries, refers to damage to milky translucent and hard tooth enamel that protects dentin covering the surface of the head of a tooth by acids produced when sugar, starch, and the like are decomposed by bacteria in the mouth.

In dentistry, for treatment of tooth decay, the rotten part of a tooth is removed using a perforator to form a cavity, and then the inside of the cavity is filled with any one filling material selected from among amalgam, light-cured resins, self-cured resins, glass ionomers, gold inlay, resin inlay, and zirconia. Then, to finish the tooth decay treatment, the filling material is compacted, condensed, and polished to impart smoothness.

In addition, when treatment of dental pulp present in the inside of a tooth is required, the dental pulp of a dental root is removed, the resulting cavity is filled with a filling material, such as root canal filling cement or a sealer, as a replacement material, and then the treatment site is sealed.

In general, when tooth decay treatment is performed using a dental filling device, a solid filling material in the dental filling device is heated to be converted into a liquid phase. Then, the liquid filling material is injected from the dental filling device to fill a tooth decay treatment site. Thus, the heating properties of a dental filling device may affect the quality of tooth decay treatment. Therefore, in recent years, to improve the reliability of dental treatment, various research has been actively performed to increase the filling efficiency of a dental filling device.

DISCLOSURE

Technical Problem

Therefore, the present invention has been made in view of the above problems, and it is an objective of the present invention to provide an induction heating type dental filling device having improved heating properties by preventing heat loss when a filling material is heated and having improved operational stability.

Technical Solution

One aspect of the present invention provides an induction heating type dental filling device including a body unit grippable by a user; a filling unit containing a refillable filling material and connected to the body unit so that one side thereof is insulated from the body unit; a heating unit disposed in close contact with the filling unit and heating the filling material using induced current to convert the filling material into a liquid state; a pressing unit for pressing the heated filling material to discharge the heated filling material to the outside of the filling unit; and a shielding unit for shielding the heat and magnetic field of the heating unit.

According to one aspect of the present invention, the filling unit may include a reservoir formed of a metallic material and having a tubular shape so as to contain the filling material therein; an insulator including a fixing member coupled to the outer circumferential surface of one end of the reservoir and formed of an insulating material and a connection bushing coupled to the fixing member and having bushing threads that are connectable to the body unit and are formed along the outer circumferential surface of the connection bushing; and a needle connected to the other end of the reservoir to discharge the heated filling material, wherein the reservoir communicates with the body unit to receive the filling material through a filling hole formed through the body unit so that the reservoir is refilled with the filling material.

According to one aspect of the present invention, the heating unit may include a bobbin coupled to the reservoir and an induction coil wound around the bobbin and responsible for generating induced current by a magnetic field.

According to one aspect of the present invention, the reservoir may include a metal tube formed of an aluminum alloy and having no thread on the outer circumferential surface thereof and having a thickness of 0.3 mm to 0.7 mm and a length of 13 mm to 17 mm.

According to one aspect of the present invention, the needle may be screwed to the inner circumferential surface of the other end of the reservoir.

According to one aspect of the present invention, a filling hole for refilling the filling material may be formed through the body unit so as to communicate with the reservoir.

According to one aspect of the present invention, the shielding unit may include at least one shielding cap for covering the outer circumferential surface of the heating unit.

According to one aspect of the present invention, the shielding unit may include a first shielding cap for covering the heating unit to shield a magnetic field and a second shielding cap for covering the first shielding cap to shield a magnetic field and heat.

According to one aspect of the present invention, the first shielding cap may be formed by double injection molding so that at least a portion thereof includes a metallic material.

Another aspect of the present invention provides a dental filling device including a body unit grippable by a user; a filling unit that includes a reservoir formed of a metallic material and containing a filling material therein and an insulator formed of an insulating material and connecting the reservoir to the body unit and that serves to support the filling material so as to be discharged outside; a heating unit for heating the filling material contained in the filling unit using induced current; a pressing unit for pressing the heated filling material to discharge the heated filling material to the outside of the filling unit; and a shielding unit for shielding the heat and magnetic field of the heating unit.

According to one aspect of the present invention, a filling hole may be formed through the body unit to communicate with the inside of the body unit, and the reservoir may be in communication with the filling hole and may be refilled with the filling material.

According to one aspect of the present invention, the reservoir may be formed in the shape of a metal pipe without threads on the outer circumferential surface thereof, and the insulator may include a ring-shaped fixing member coupled to the outer circumferential surface of one end of the reservoir and formed of an insulating material and a connection bushing coupled to the fixing member so as to be in close contact with the outer circumferential surface of the fixing member and having bushing threads formed along the outer circumferential surface of a portion of the connection bushing to allow the connection bushing to be screwed to the body unit.

According to one aspect of the present invention, the reservoir may be formed of an aluminum alloy and may have a thickness of 0.3 mm to 0.7 mm and a length of 13 mm to 17 mm.

According to one aspect of the present invention, the filling unit may include a needle connected to the other end of the reservoir to guide discharge of the filling material.

According to one aspect of the present invention, the heating unit may include a bobbin disposed in close contact with the reservoir and an induction coil wound around the bobbin and responsible for generating induced current by a magnetic field.

According to one aspect of the present invention, the shielding unit may include at least one shielding cap for covering the outer circumferential surface of the heating unit.

According to one aspect of the present invention, the shielding unit may be formed by double injection molding so that at least a portion thereof includes a metallic material, and may include a first shielding cap for covering the heating unit to shield a magnetic field and a second shielding cap for covering the first shielding cap to shield a magnetic field and heat.

Advantageous Effects

Advantages of the present invention having the above-described configuration are as follows. First, the reservoir of a filling unit has the shape of a metal tube, no thread is formed on the outer circumferential surface of the reservoir, and the reservoir is screwed to a body unit through an insulator. Therefore, heat loss that occurs when a filling material in the filling unit is heated can be prevented, and the efficiency of heating a filling material can be improved, thereby improving filling quality.

Second, since, when a filling material contained in the filling unit is consumed, the filling unit can be refilled with a fresh filling material, replacement of the filling unit is unnecessary, such that usability and economic efficiency can be improved.

Third, the clamping force of the filling unit with respect to the body unit is increased, so that operational stability and the reliability of a therapist can be improved.

Fourth, since the heat and magnetic field of the heating unit are shielded, operational stability can be excellent.

MODES OF THE INVENTION

Hereinafter, a preferred embodiment of the present invention will be described with reference to the accompanying drawings.

Figure 1:
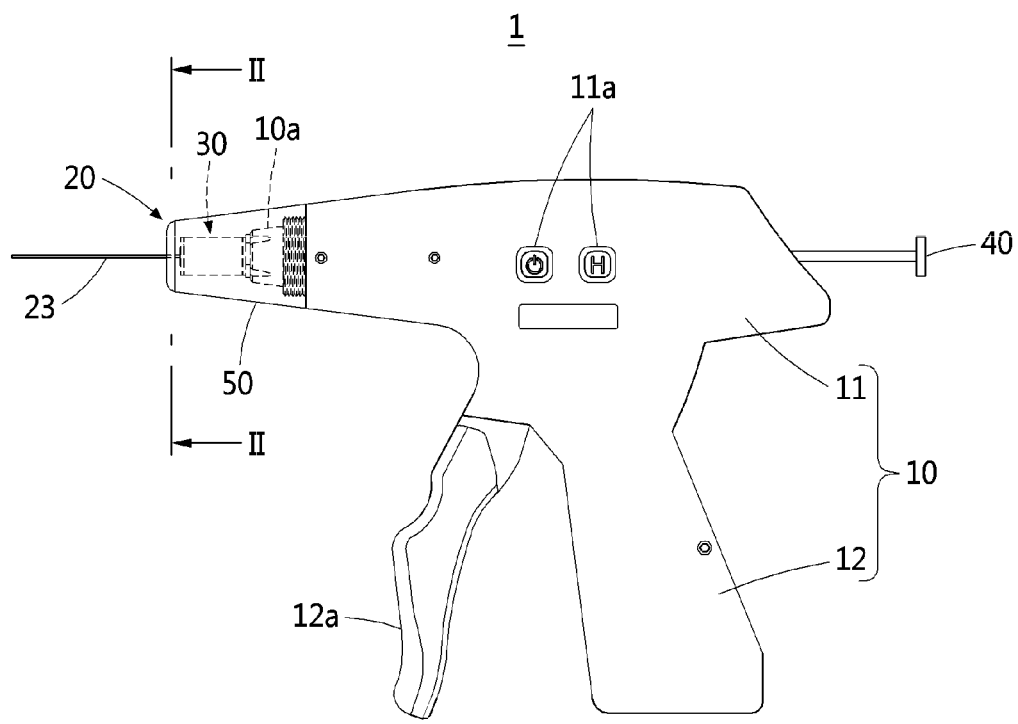
FIG. 1 is a schematic view of a dental filling device according to one embodiment of the present invention.
Figure 2:
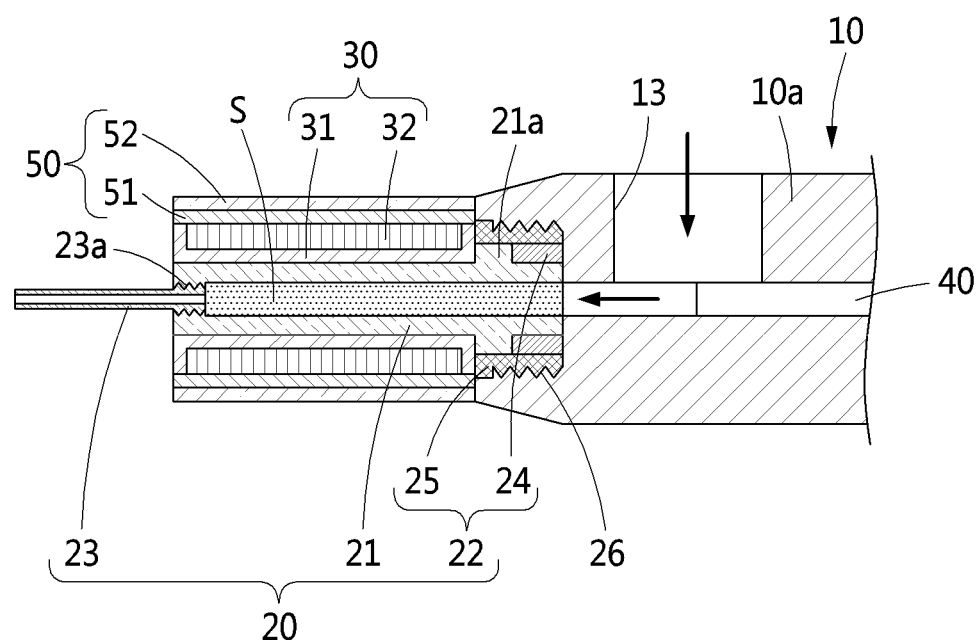
FIG. 2 is a cross-sectional view taken along line II-II shown in FIG. 1.

Referring to FIGS. 1 and 2, an induction heating type dental filling device 1 according to one embodiment of the present invention includes a body unit 10, a filling unit 20, a heating unit 30, a pressing unit 40, and a shielding unit 50.

The body unit 10 has a gun shape grippable by a user. The body unit 10 includes an upper housing 11 for supporting the filling unit 20, the heating unit 30, the pressing unit 40, and the shielding unit 50 to be described later and a lower housing 12 connected to a lower portion of the upper housing 11 and serving as a handle grippable by a user. The upper and lower housings 11 and 12 are in communication with each other. The inside of the housings is not shown in detail, and the housings are provided with a power supply means (not shown) for supplying power to the dental filling device 1.

In addition, the upper housing 11 is provided with at least one operation key 11a for inputting operation signals, and an operation vane 12a gripped and operated by a user is coupled to the lower housing 12 so as to project from the lower housing 12 and be rotatable. The operation key 11a is operated by a user to turn power on/off. In addition, the pressing unit 40 to be described later is operated by rotating the operation vane 12a toward the lower housing 12 in a state wherein a user grips the operation vane 12a.

In addition, a filling hole 13 is formed through the upper housing 11, and a filling material S is supplied through the filling hole 13 and flows into the filling unit 20 to be described later. That is, the inside of the upper housing 11 is configured to communicate with the filling unit 20, so that the filling material S flows into the filling unit 20 through the filling hole 13 provided in the upper housing 11 and the filling unit 20 is refilled with the filling material S.

The filling unit 20 is formed of a metallic material, and the filling material S is contained in the filling unit 20. One side of the filling unit 20 is connected to the body unit 10 with an insulator 22 interposed therebetween, and the other side of the filling unit 20 is formed to have a structure capable of discharging the filling material S. As shown in FIG. 2, the filling unit 20 includes a reservoir 21, the insulator 22, and a needle 23.

A space in which the filling material S is contained is provided in the reservoir 21 and is formed of a metallic material. The reservoir 21 includes a cylindrical metal tube having a hollow interior, and a fixing protrusion 21a for fixing the body unit 10 protrudes from the outer circumferential surface of one side of the reservoir 21. One side of the reservoir 21 is connected to the body unit 10 and the other side thereof is connected to the needle 23 to be described later, so that the filling material S is discharged from one side toward the other side.

For example, the reservoir 21 may be formed of an aluminum alloy and may have a thickness of about 0.5 mm and a length of 15 mm or less. In this case, the thickness of the reservoir 21 is determined in consideration of the range within which the reservoir 21 is not damaged by pressure for pressurizing the filling material S and the range within which the filling material S is sufficiently heated by limited current. For example, when the thickness of the reservoir 21 is 0.5 mm or more, limited current for heating the filling material S in the reservoir 21 may be insufficient. When the thickness of the reservoir 21 is 0.5 mm or less, the reservoir 21 may be damaged by pressure applied by the pressing unit 40 to be described later. In addition, when the length of the reservoir 21 is 15 mm or more, the filling material S may not be sufficiently heated.

The insulator 22 is formed of an insulating material, and one side, i.e., one end, of the reservoir 21 is connected to the body unit 10. The insulator 22 includes a fixing member 24 coupled to one end of the reservoir 21 and formed of an insulating material and a connection bushing 25 coupled to the fixing member 24 and having bushing threads 26 that are connectable to the body unit 10 and that are formed along the outer circumferential surface of the connection bushing 25.

Figure 3:
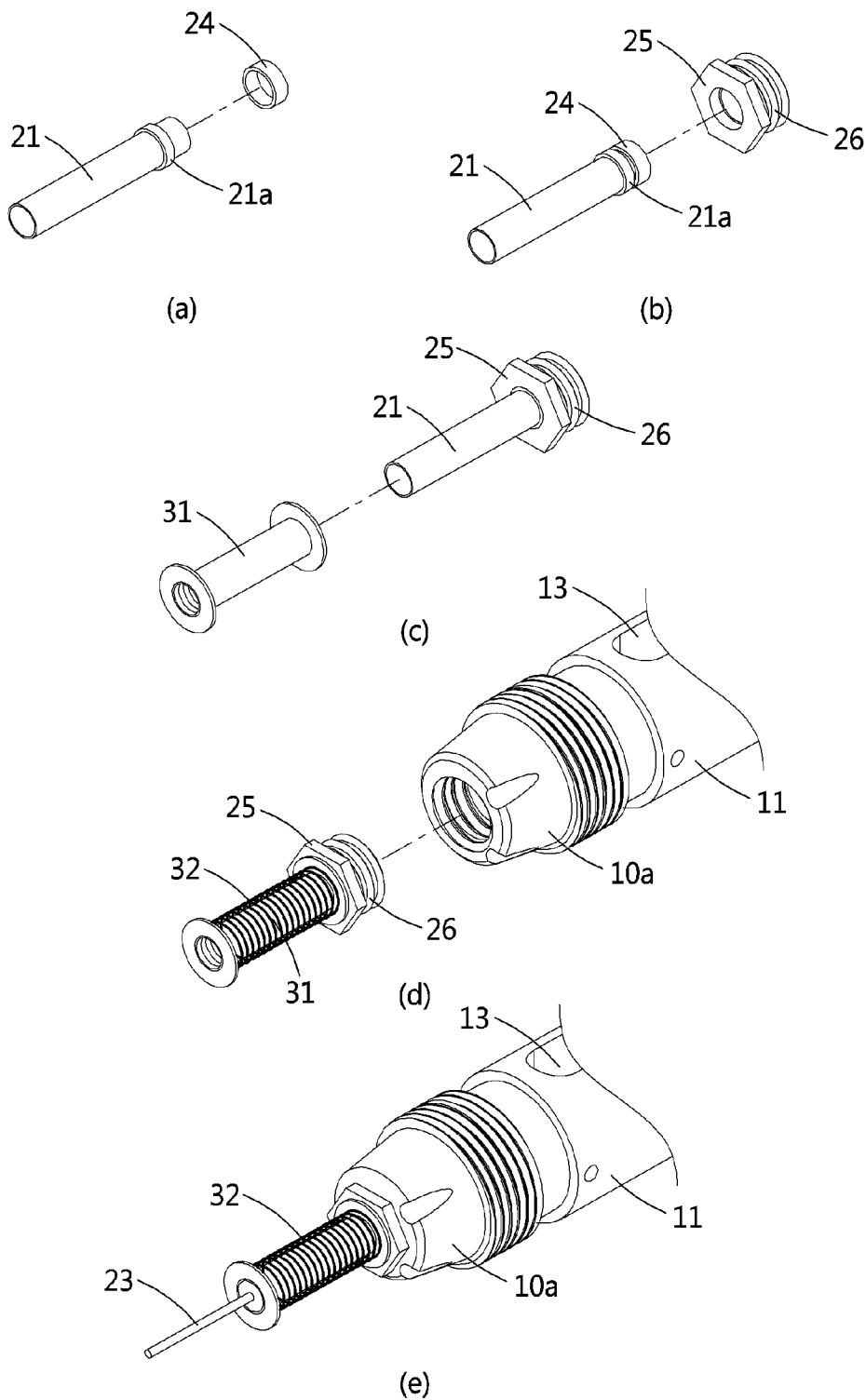
FIG. 3 is a perspective view showing a stepwise process of connecting a filling unit and a heating unit to the body unit shown in FIG. 1.

As shown in FIG. 3, the fixing member 24 is formed in a ring shape and is in close contact with the outer circumferential surface of one side of the reservoir 21 having a metal pipe shape. In this case, the fixing member 24 has an outer diameter identical to that of the fixing protrusion 21a protruding from one side of the reservoir 21 so as to be brought into close contact with the fixing protrusion 21a. The fixing member 24 is formed of an insulating material such as rubber and silicon and is brought into close contact with the reservoir 21.

Like the fixing member 24, the connection bushing 25 is formed of an insulating material and is in close contact with the reservoir 21. In this case, the fixing member 24 provided at one side of the reservoir 21 is interposed between the connection bushing 25 and the reservoir 21. The inner diameter of the connection bushing 25 corresponds to the outer diameter of the fixing member 24, so that the connection bushing 25 and the fixing member 24 are brought into close contact with the fixing protrusion 21a of the reservoir 21.

In addition, the bushing threads 26 are formed on a part of the outer circumferential surface of the connection bushing 25 to guide the connection bushing 25 so that the connection bushing 25 is screwed to the body unit 10 through the bushing threads 26. That is, the connection bushing 25 is formed of an insulating material and is connected to the body unit 10 through screw connection in a state wherein the connection bushing 25 is in close contact with the reservoir 21 while the fixing member 24 is interposed between the reservoir 21 and the connection bushing 25. Accordingly, the connection bushing 25 secures one side of the reservoir 21 to the body unit 10 in an insulated state.

Due to a configuration wherein the bushing threads 26 are formed on the connection bushing 25, separate threads for connection with the body unit 10 need not be formed in the reservoir 21. Therefore, the reservoir 21 has a smooth outer circumferential surface, so that deterioration in heat generation caused when eddy current generated by the heating unit 30 to be described later flows out along threads is prevented.

As shown in FIGS. 2 and 3, the connection bushing 25 is connected to a peak chamber 10a provided in the upper housing 11. The peak chamber 10a is formed of a rigid material and supports the filling unit 20 connected to the side of the upper housing 11.

The needle 23 is connected to the other side, i.e., the other end, of the reservoir 21 and discharges the filling material S to the outside. Needle threads 23a are formed on one end of the needle 23, so that the needle 23 is screwed to the other side of the reservoir 21.

The heating unit 30 is in close contact with the other side of the filling unit 20 and uses induced current to heat the filling material S to convert the filling material S into a liquid phase. As shown in FIGS. 2 and 3, the heating unit 30 includes a bobbin 31 coupled to the other side of the reservoir 21 and an induction coil 32 wound around the bobbin 31.

The bobbin 31 is provided to surround the outer circumferential surface of the other side of the reservoir 21 in which the insulator 22 is not provided. Preferably, the bobbin 31 is formed of a metallic material having an excellent heat transfer coefficient so that heat generated by the induction coil 32 is transferred to the reservoir 21.

The induction coil 32 is wound around the bobbin 31 and heats the filling material S provided in the reservoir 21 using induced current generated by a magnetic field generated by applied current. Eddy current is generated on the surface of the reservoir 21 formed of a metallic material due to the electromagnetic induction characteristic of the induction coil 32 so that the filling material S contained in the reservoir 21 is heated and softened. Although not shown in detail, the induction coil 32 is connected to a power supply means (not shown) provided inside the body unit 10 and is supplied with high-frequency current.

The pressing unit 40 presses the heated filling material S and discharges the heated filling material S to the outside. The pressing unit 40 is not shown in detail. The pressing unit 40 presses the filling material S contained in the reservoir 21 to be discharged through the needle 23 in conjunction with the operation of rotating the operation vane 12a toward the lower housing 12. The pressing unit 40, which is a type of piston, is in close contact with the inner diameter of the reservoir 21, which is a metal tube, and presses the filling material S toward the needle 23.

The shielding unit 50 shields the heat and magnetic field of the heating unit 30. The shielding unit 50 includes at least one shielding cap to cover the outer circumferential surface of the heating unit 30. In this embodiment, the shielding unit 50 includes first and second shielding caps 51 and 52.

The first shielding cap 51 covers the heating unit 30 to shield the magnetic field of the heating unit 30. The first shielding cap 51 is formed using double injection molding, and the interior thereof is formed of a metal. Therefore, the first shielding cap 51 shields the magnetic field generated from the heating unit 30.

The second shielding cap 52 is disposed in close contact with the first shielding cap 51 so as to cover the first shielding cap 51, and shields heat and a magnetic field. The second shielding cap 52 covers the first shielding cap 51 to shield heat, and forms the appearance of the dental filling device 1.

A process by which the filling unit 20 and the heating unit 30 of the dental filling device 1 having the above-described structure are coupled with each other will be described with reference to FIG. 3.

As shown in (a) of FIG. 3, the fixing member 24 of the insulator 22 is in close contact with one side of the reservoir 21, a type of metal tubes, that is formed of a metallic material and serves to contain the filling material S. In this case, the reservoir 21 has a tube shape, and the outer circumferential surface thereof is smooth. The fixing member 24 is formed of an insulating material and has a ring shape.

As shown in (b) of FIG. 3, the connection bushing 25 is coupled to the reservoir 21 in a state wherein the fixing member 24 is in close contact with the reservoir 21. In this case, the connection bushing 25 is formed of an insulating material, and the bushing threads 26 are formed on the outer circumferential surface of the connection bushing 25. The connection bushing 25 has an inner diameter corresponding to the fixing member 24 and an fixing protrusion 21a, so that the connection bushing 25 is fixed to one side, i.e., one end, of the reservoir 21.

As shown in (c) of FIG. 3, the bobbin 31 of the heating unit 30 is coupled to the other side of the reservoir 21 that is not connected to the insulator 22. In this case, since the outer circumferential surface of the reservoir 21 has a smooth shape, the bobbin 31 and the reservoir 21 are completely in close contact with each other without a gap.

As shown in (d) of FIG. 3, the connection bushing 25 coupled to one side of the reservoir 21 is connected to the body unit 10 in a state wherein the induction coil 32 for heating the filling material S is wound around the bobbin 31 coupled to the other side of the reservoir 21. In this case, the connection bushing 25 is screwed to one end of the upper housing 11 of the body unit 10 through the bushing threads 26 formed on the connection bushing 25, so that the reservoir 21 of the filling unit 20 is connected to the body unit 10 with the insulator 22 interposed therebetween.

In addition, the reservoir 21 may be connected to the peak chamber 10a of the body unit 10 through the connection bushing 25 before the bobbin 31 is coupled to the other side of the reservoir 21.

As shown in (e) of FIG. 3, as a final step of connecting the filling unit 20 and the heating unit 30 to the body unit 10, the needle 23 is coupled to the other side of the reservoir 21. In this case, although not shown in FIG. 3, as shown in FIGS. 1 and 2, the first and second shielding caps 51 and 52 are provided to cover the heating unit 30, so that the heat and magnetic field of the heating unit 30 are shielded in two steps.

In root canal treatment, the filling material S in the reservoir 21 is softened by induced current generated in the heating unit 30, and the softened filling material S is discharged to the outside through the needle 23 by the pressing force of the pressing unit 40. In this case, when the filling material S contained in the reservoir 21 is consumed, the filling material S flows into the reservoir 21 through the filling hole 13 provided in the upper housing 11 of the body unit 10, and thus the reservoir 21 is refilled with the filling material S.

As described above, the present invention has been described with reference to preferred embodiments. However, these embodiments are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

The invention claimed is:

1. An induction heating type dental filling device, comprising:
    a body unit grippable by a user;
    a filling unit containing a refillable filling material and connected to the body unit so that one side thereof is insulated from the body unit;
    a heating unit disposed in close contact with the filling unit and heating the filling material using induced current to convert the filling material into a liquid state;
    a pressing unit for pressing the heated filling material to discharge the heated filling material outside of the filling unit; and
    a shielding unit for shielding heat and a magnetic field of the heating unit,
    wherein the filling unit comprises a reservoir formed of a metallic material and having a tubular shape so as to contain the filling material therein; an insulator comprising a fixing member coupled to an outer circumferential surface of one end of the reservoir and formed of an insulating material and a connection bushing coupled to the fixing member and having bushing threads that are connectable to the body unit and are formed along an outer circumferential surface of the connection bushing; and a needle connected to another end of the reservoir to discharge the heated filling material.

2. The induction heating type dental filling device according to claim 1, wherein the reservoir communicates with the body unit to receive the filling material through a filling hole formed through the body unit so that the reservoir is refilled with the filling material.

3. The induction heating type dental filling device according to claim 2, wherein the heating unit comprises a bobbin coupled to the reservoir; and an induction coil wound around the bobbin and responsible for generating induced current by a magnetic field.

4. The induction heating type dental filling device according to claim 2, wherein the reservoir comprises a metal tube formed of an aluminum alloy and having no thread on an outer circumferential surface thereof and having a thickness of 0.3 mm to 0.7 mm and a length of 13 mm to 17 mm.

5. The induction heating type dental filling device according to claim 2, wherein the needle is screwed to an inner circumferential surface of the other end of the reservoir.

6. The induction heating type dental filling device according to claim 2, wherein a filling hole for refilling the filling material is formed through the body unit so as to communicate with the reservoir.

7. The induction heating type dental filling device according to claim 1, wherein the shielding unit comprises at least one shielding cap for covering an outer circumferential surface of the heating unit.

8. The induction heating type dental filling device according to claim 1, wherein the shielding unit comprises a first shielding cap for covering the heating unit to shield a magnetic field; and a second shielding cap for covering the first shielding cap to shield a magnetic field and heat.

9. The induction heating type dental filling device according to claim 8, wherein the first shielding cap is formed by double injection molding so that at least a portion thereof comprises a metallic material.

10. An induction heating type dental filling device, comprising:
    a body unit grippable by a user;
    a filling unit that comprises a reservoir formed of a metallic material and containing a filling material therein and an insulator formed of an insulating material and connecting the reservoir to the body unit and that serves to support the filling material so as to be discharged outside;
    a heating unit for heating the filling material contained in the filling unit using induced current;
    a pressing unit for pressing the heated filling material to discharge the heated filling material outside of the filling unit; and
    a shielding unit for shielding heat and a magnetic field of the heating unit.

11. The induction heating type dental filling device according to claim 10, wherein a filling hole is formed through the body unit to communicate with an inside of the body unit, and the reservoir is in communication with the filling hole and is refilled with the filling material.

12. The induction heating type dental filling device according to claim 10, wherein the reservoir is formed in a shape of a metal pipe without threads on an outer circumferential surface thereof, and the insulator comprises a ring-shaped fixing member coupled to an outer circumferential surface of one end of the reservoir and formed of an insulating material; and a connection bushing coupled to the fixing member so as to be in close contact with an outer circumferential surface of the fixing member and having bushing threads formed along an outer circumferential surface of a portion of the connection bushing to allow the connection bushing to be screwed to the body unit.

13. The induction heating type dental filling device according to claim 12, wherein the reservoir is formed of an aluminum alloy and has a thickness of 0.3 mm to 0.7 mm and a length of 13 mm to 17 mm.

14. The induction heating type dental filling device according to claim 12, wherein the filling unit comprises a needle connected to the other end of the reservoir to guide discharge of the filling material.

15. The induction heating type dental filling device according to claim 10, wherein the heating unit comprises a bobbin disposed in close contact with the reservoir; and an induction coil wound around the bobbin and responsible for generating induced current by a magnetic field.

16. The induction heating type dental filling device according to claim 10, wherein the shielding unit comprises at least one shielding cap for covering an outer circumferential surface of the heating unit.

17. The induction heating type dental filling device according to claim 10, wherein the shielding unit is formed by double injection molding so that at least a portion thereof comprises a metallic material, and comprises a first shielding cap for covering the heating unit to shield a magnetic field and a second shielding cap for covering the first shielding cap to shield a magnetic field and heat.

* * * * *